United States Patent [19]

Bell

[11] Patent Number: 5,068,976
[45] Date of Patent: Dec. 3, 1991

[54] APPARATUS FOR LOCATING AND DRILLING STUD PLATE HOLES

[76] Inventor: Cecil J. Bell, 2203 Montecido Rd., Ramona, Calif. 92065

[21] Appl. No.: 603,476

[22] Filed: Oct. 25, 1990

Related U.S. Application Data

[63] Continuation-in-part of Ser. No. 466,718, Jan. 16, 1990, abandoned.

[51] Int. Cl.$^5$ ............................................. B25H 7/04
[52] U.S. Cl. ........................................ 33/666; 33/574; 33/613; 33/644
[58] Field of Search ................ 353/613, 644, 666, 669, 353/574, 578, 638, 639, 640, 642; 408/72 R, 72 B, 75, 74

[56] References Cited

U.S. PATENT DOCUMENTS

| | | | |
|---|---|---|---|
| 2,384,071 | 9/1945 | Boyer | 33/574 |
| 3,282,132 | 11/1966 | Neuschotz | 33/638 |
| 3,406,460 | 10/1968 | Colwell | 33/574 |
| 4,363,173 | 12/1982 | Caldera | 33/666 |
| 4,520,571 | 6/1985 | Harding | 33/666 |
| 4,589,806 | 5/1986 | Rotta, Jr. | 408/72 R |
| 4,893,970 | 1/1990 | Becraft | 33/574 |
| 4,948,304 | 8/1990 | Kobayashi | 33/638 |
| 4,993,168 | 2/1991 | Acuna | 33/613 |

OTHER PUBLICATIONS

Charles F. Henry, American Machinist, 9/27/33, pp. 637–638.

Primary Examiner—William A. Cuchlinski, Jr.
Assistant Examiner—William C. Dowling
Attorney, Agent, or Firm—Baker, Maxham, Jester & Meador

[57] ABSTRACT

A bolt hole locating and drilling apparatus comprises an elongated generally rectangular bar having first and second ends, a first semi-circular notch in the first end, a second semi-circular notch in the second end, a through bore extending through the bar in a location intermediate the ends thereof for dividing the bar into a first arm of a first length of about three and one-half inches and a second arm of a second length of about five and one-half inches, a drill shaft rotatably journaled in the bore mounted for reciprocable movement therein.

14 Claims, 1 Drawing Sheet

U.S. Patent  Dec. 3, 1991  5,068,976

APPARATUS FOR LOCATING AND DRILLING STUD PLATE HOLES

REFERENCE TO RELATED APPLICATION

This is a continuation-in-part of my co-pending application Ser. No. 07/466,718 filed Jan. 16, 1990 now abandoned.

BACKGROUND OF THE INVENTION

The present invention relates generally to bolt locating devices and pertains particularly to a new and improved apparatus for the location and accurate drilling of bolt holes for stud plates for slab constructed buildings.

Many residential and commercial buildings are constructed by what is commonly known as slab and frame construction. A concrete slab is typically poured on site, and leveled for forming the floor and foundation for the building. A wood frame structure is then placed on and secured to the slab.

When the slab is being poured, bolts or studs are placed in the concrete, extending upward along rows where plates for the framing is to be secured to the slab floor. Once the concrete has dried, the framer, in order to attach the plate to the floor, typically places the plate member, which is a two-by-six or two-by-four depending on the construction, directly on top of the preset bolts and hits the plate with a hammer over each bolt to mark the position of the bolt. Holes are then drilled where the depressions are made, and the plate then fitted over the bolts to the slab.

One difficulty with this approach is that the plate may not be as precisely aligned as is desired with the edge of the slab. Another difficulty is that the bolts are frequently never quite perpendicular, and the resulting hole is therefore not properly aligned. Another difficulty is that the bolts are frequently of a different height, such that only certain holes are marked. These problems of misalignment are time consuming and frustrating for the carpenter to correct or accommodate.

One solution to this problem is proposed in U.S. Pat. No. 3,406,460 issued Oct. 22, 1968 to Colwell and entitled "Bolt Hole Marker". This device comprises a measuring arm 16 having an end 18 for engagement with the bolt, and a marking punch 24 having a head 26, and a point 20 mounted within the arm at a distance equaling the width of the plate. In use, the plate is aligned adjacent to the bolts, and the marker is utilized to locate the lateral position of the hole, and is tapped with a hammer to make an indentation where the hole is to be placed. Again, this provides one difficulty in that the carpenter may not precisely align the markers square to the bolt, resulting in longitudinal mis-positioning of the bolt sufficient to make mounting of the plate difficult. Another problem is that in drilling the holes, the drill may not be precisely centered within the punch mark, thereby resulting in the hole being slightly out of position. This again results in difficulty in mounting the plate once the holes have been drilled.

In my aforementioned application, I disclosed an improved bolt hole locating and drilling device of simple construction. I have subsequently devised an apparatus for more precisely and effectively locating and drilling the holes.

SUMMARY AND OBJECTS OF THE INVENTION

It is the primary object of the present invention to provide an improved bolt hole locating apparatus that overcomes the above problems of the prior art.

In accordance with a primary aspect of the present invention, a bolt hole locator includes a locating and measuring arm, with a rotating drill bit shaft mounted therein for locating and drilling a hole with respect to a bolt

BRIEF DESCRIPTION OF THE DRAWING

The above and other objects and advantages of the present invention will become apparent from the following description when read in conjunction with the accompanying drawings wherein.

DETAILED DESCRIPTION OF A PREFERRED EMBODIMENT

Figure 1:
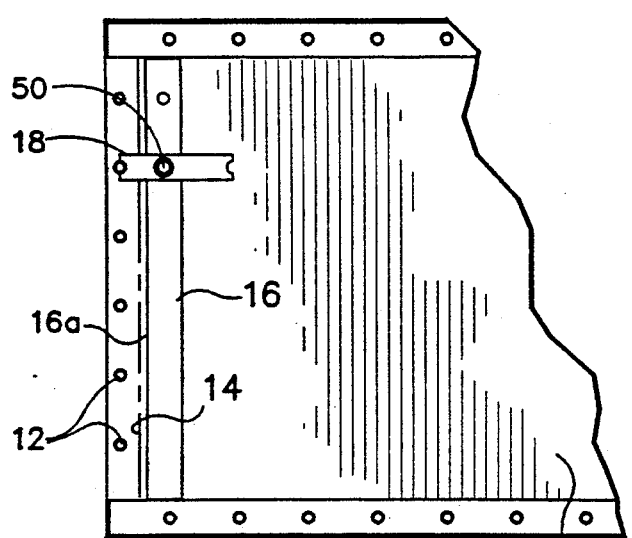
FIG. 1 is a top plan view illustrating a slab for a building with framed construction and showing a preferred embodiment of the invention in use.

Referring to FIG. 1 of the drawings, there is illustrated a typical concrete slab, which has been laid or poured down for a frame building of a rectangular configuration. A plurality of bolts or studs 12 have been placed along the edges of the slab for the attachment of the sills or stud plate members of the wooden framing for the building. In order to mount the plate 16, holes must be accurately bored therein for receiving the bolts, such that the holes correspond precisely to the positioning of the bolts along the edge of the slab. These must be positioned to enable the edge of the plate to align substantially even with the edge of the slab.

Figure 2:
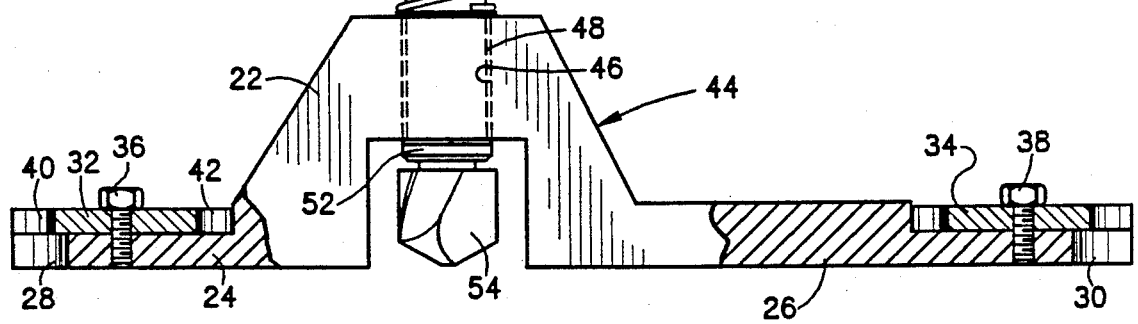
FIG. 2 is a side elevation view in section of a preferred embodiment of the invention.
Figure 3:
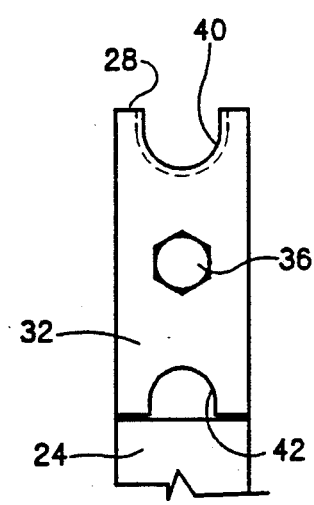
FIG. 3 is a partial top plan view illustrating a detail of the arm tip of the invention.

Referring to FIGS. 2 and 3, a preferred embodiment of the invention is illustrated and designated generally by the numeral 18. The drill locater or template 18 comprises an elongated generally rectangular bar or body 22, which may be either metal or plastic, and of a width of approximately an inch and a half to two inches. The bar has a length along the order of approximately nine inches, with an arch intermediate the ends for mounting a drill bit and dividing it into two arms. The bar is divided to provide a first arm 24 on the order of one end of a length of three and one-half ($3\frac{1}{2}$) inches corresponding to the nominal width of a two-by-four. A second arm 26 on the other end of the bar has a length of approximately five and one-half ($5\frac{1}{2}$) inches to correspond to the nominal width of a two-by-six.

Each end of the bar or the end of each arm is provided with a semi-circular notch 28 and 30 to fit the largest of customary or typical size of bolts or studs of the foundation. The semi-circular notch is preferably equal in diameter to the diameter of the particular size bolt to precisely locate the center of the hole in the plate to receive the bolt. These studs or bolts vary in size from one-half ($\frac{1}{2}$) inch up to one and one-eighth (1/18) inches.

In the preferred embodiment, two or more size stud notches may be provided. These may be provided by providing the largest ones 28 and 30 in the ends of the arms 24 and 26, and additional notches in the ends of a pair of identical plates 32 and 34 attached by bolts 36 and 38 on the top of each arm. The plates may be identical with plate 32 illustrated and described in FIG. 3. The plate may be formed of on quarter inch bar stock of the same width as the arms 24 and 26. The plate 32 is provided with a pair of notches 40 and 42, each progressively smaller in diameter than the notch 30 and the other. For example, notch 30 may be three-quarters (¾) of an inch, with notch 40 being five-eights (⅝) inch and notch 42 being one-half (½) inch for residential buildings. The notch may also be one and one-eighth (1⅛) inches, with plates 32 providing progressively smaller diameters. Thus, many different size studs for both residential and commercial buildings can be accommodated by a single apparatus. The plate 32 is either removed or rotated out of the way when the largest studs are being accommodated and rotated to present the smaller notches for smaller studs.

The bar is provided with with an arch 44 having suitable journal means in the form of a cylindrical bore 46, with a bearing 48 for rotatably mounting a drill bit shaft 50. The arch provides a space beneath the bar for receiving or retracting a drill bit tip spaced above the lower surface of the bar and above a surface on which it rests. The drill shaft 50 is preferably of the type having a drill tip formed on one end thereof. A typical shaft may be one-half inch with bit sizes upward to one and one-half inch and above. However, it may also have a coupling or chuck 52 at one end for selectively mounting different size drill bits 54. The chuck or coupling 52 will be larger in diameter than the bore of bearing 48, which will prevent it and the drill from passing upward therethrough. A coil compression spring 56 biases against the upper surface to arch 44 and a retainer collar 58 on the shaft 50. This spring 56 retracts the drill bit 54 upward into a recess formed by arch 44 so that the tip of the bit is above the lower surface of the arms 24 and 26. A hand held drill motor may be coupled to the upper end of shaft 50 for driving the drill bit and biasing it downward into engagement with a plate to be drilled.

Figure 4:
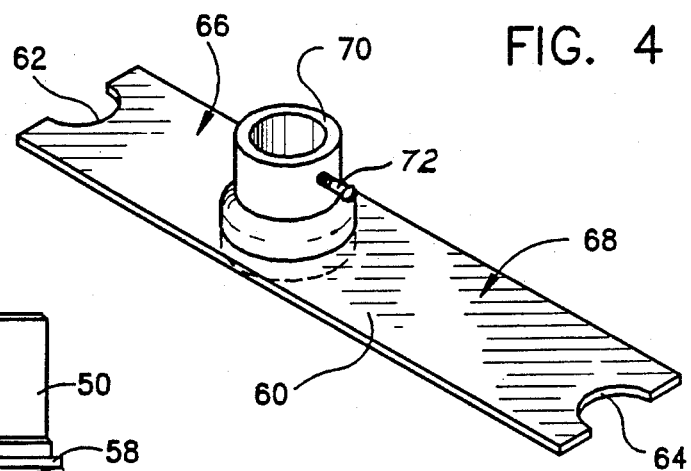
FIG. 4 is a perspective view of an alternate embodiment.

Referring to FIG. 4, an alternate embodiment, as disclosed in the parent application, is illustrated. This embodiment comprises an elongated flat plate or bar 60 having bolt engaging notches 62 and 64 in the ends thereof. An elongated tubular drill attachment collar 70 is journaled within a bore of the plate 60 at a position along the length thereof to precisely divide it or locate the center of the drill at the juncture of the pair of arms 66 and 68 as in the previous embodiment. The drill collar 70 has a bore for fitting over a drill bit of a size slightly larger than that of the studs to drill a hole in the stud plate for receiving the respective bolts or studs. A set screw or the like 72 within the collar secures the collar directly to the drill bit at a position to set the depth of the bit of the drill to extend through the base plate.

The drill collar has an upper tubular section, with a lower journal section having a journal portion mounted in a suitable bearing assembly. The bearing assembly may be such as roller or ball bearings or a sleeve bearing to provide a greater long-wearing surface if desired. The drill collar in the illustrated embodiment is preferably formed and mounted within the plate or bar 60 in a manner to maintain a fairly uniform precise upright orientation and to easily rotate.

In operation, with reference to FIG. 1, the carpenter or framer first lays down a chalk line 14 parallel to the outer edge of the slab at a position where the inner edge of the plate 16 is to be located. He then selects and places a plate 16, such as either a two-by-four or two-by-six, with the outer edge 16a thereof aligned with the chalk line 14. He then selects the drill locator apparatus and positions the appropriate arm perpendicular to the plate 16 at a bolt 12. The framer first mounts the drill bit 54 of the appropriate size in the chuck 52 of the drill shaft 50. He then attaches a hand held drill motor to the upper end of the drill shaft 50. He then locates the hole locating apparatus, with the appropriate arm and its notch in direct engagement with the adjacent bolt (FIG. 1). He then drills a hole where the drill is located in this fashion. This process is repeated for each bolt along the length or width of the slab. This approach precisely locates the hole for the bolt a distance from the edge of the plate corresponding to the position of the bolt with respect to the intended position of the plate.

Once the holes are completed, the plate is placed over and the bolts received in the holes. Washers and nuts are then placed on the bolts or studs to secure the plate in place.

While I have illustrated and described my invention by means of specific embodiments, it should be understood that numerous changes and modifications may be made therein without departing from the spirit and scope of the invention as defined in the appended claims. I further assert and sincerely believe that the above specification contains a written description of the invention and the manner and process of making and using it, in such full, clear, concise, and exact terms as to enable any person skilled in the art to which it pertains, or with which it is most nearly concerned, to make and use the same, and further that it sets forth the best mode contemplated by me for carrying out the invention.

I claim:

1. A bolt hole locator comprising in combination:
    an elongated generally rectangular bar having first and second ends, and an arch intermediate the ends thereof for defining a retraction space for a drill bit tip;
    a first semi-circular notch in said first end for engaging a reference bolt;
    a second semi-circular notch in said second end for engaging a reference bolt;
    drill bit journal means located in said arch for rotatably journaling a shaft of a drill bit in said bar in a location intermediate to the ends thereof for dividing said bar into a first arm of a first length for locating and drilling a hole a first distance from said reference bolt and a second arm of a second length for locating and drilling a hole a second distance from said reference bolt; and
    a drill bit shaft rotatably and reciprocably mounted in said journal means for receiving and positioning a drill bit tip within said retraction space.

2. A bolt hole locator in accordance with claim 1 wherein said first arm has a length of three and one-half inches and said second arm has a length of five and one-half inches.

3. A bolt hole locator in accordance with claim 2 wherein said first and said second semi-circular notches have a first radius, and further comprising a first and a second plate mounted adjacent said first and second ends for providing at least second and third notches of a smaller radius.

4. A bolt hole locator in accordance with claim 2 wherein said drill bit journal means comprises an elongated tubular sleeve having a lower end thereof rotatably journaled in a bore in said bar.

5. A bolt hole locator in accordance with claim 4 wherein said first arm has a length of three and one-half inches and said second arm has a length of five and one-half inches.

6. A bolt hole locator in accordance with claim 1 wherein:
said drill bit shaft includes a chuck for detachably mounting a drill bit tip; and
retracting spring means comprising a compression coil spring encircling said shaft and biased between an upper surface of said arch and a collar on said shaft.

7. A bolt hole locator in accordance with claim 6 wherein said first arm has a length of three and one-half inches and said second arm has a length of five and one-half inches.

8. A bolt hole locator in accordance with claim 7 wherein said bore in said bar includes a bearing sleeve for rotatably and slideably mounting said drill bit shaft.

9. A bolt hole locator in accordance with claim 6 wherein said first and said second semi-circular notches have a first radius, and further comprising a first and a second plate mounted adjacent said first and second ends, each having at least one notch in an end thereof for providing at least second and third notches of a smaller radius.

10. A bolt hole locator in accordance with claim 2 wherein:
said drill bit shaft includes a chuck at one end for detachably mounting a drill bit tip; and
a retracting compression coil spring encircling said shaft and biased between an upper surface of said arch and a collar on said shaft for biasing said shaft in a direction for positioning a drill bit tip within said retraction space.

11. A bolt hole locator in accordance with claim 10 wherein said first and said second semi-circular notches have a first radius, and further comprising a first and a second plate mounted adjacent said first and second ends, each having at least one notch in an end thereof for providing at least second and third notches of a smaller radius.

12. A bolt hole locator in accordance with claim 11 wherein said bore in said bar includes a bearing sleeve for rotatably and slideably mounting said drill bit shaft.

13. A bolt hole locator comprising in combination:
an elongated generally rectangular bar having first and second ends and an arch intermediate the ends thereof for defining a retraction space for a drill bit tip;
a first semi-circular notch in said first end for engaging a reference bolt;
a second semi-circular notch in said second end for engaging a reference bolt;
drill bit journal means comprising an elongated tubular sleeve having a lower end thereof rotatably journaled in a bore and bearing means located in said arch for rotatably journaling a shaft of a drill bit in said bar in a location intermediate to the ends thereof for dividing said bar into a first arm of a first length of three and one-half inches for location and drilling a hole a first distance from said reference bolt and a second arm of a second length of five and one-half inches for locating and drilling a hole a second distance from said reference bolt;
a drill bit shaft rotatably and reciprocably mounted in said bearing means, and having means for detachably receiving a drill bit tip on a lower end thereof normally positioned within said retraction space; and
retraction spring means for biasing said drill bit shaft so a drill bit tip on a lower end thereof is normally positioned within said retraction space.

14. A bolt hole locator in accordance with claim 13 wherein:
said drill bit shaft includes a chuck for detachably mounting a drill bit tip; and
said retracting spring means comprises a compression coil spring encircling said shaft and biased between an upper surface of said arch and a collar on said shaft.

* * * * *